July 28, 1970            W. J. SCOTT            3,521,915
FLARELESS CONNECTION AND SEALING ELEMENT FOR SUCH A CONNECTION
Filed Jan. 24, 1968
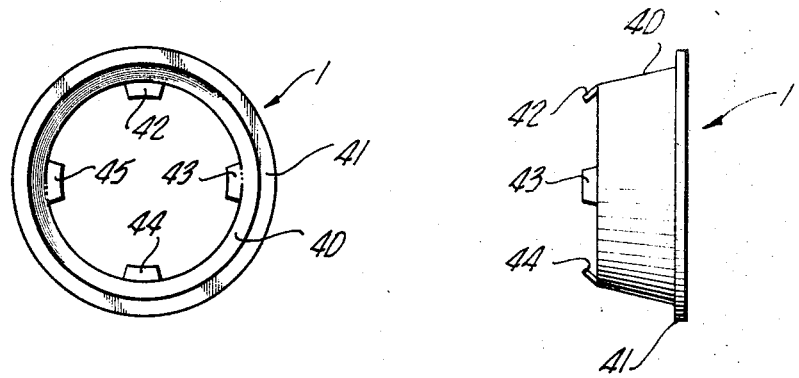
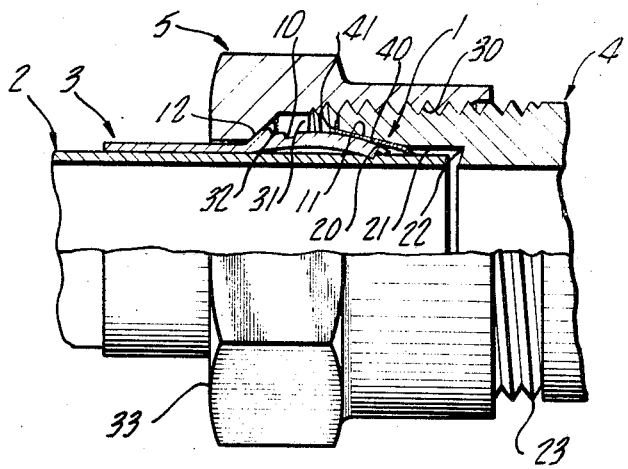
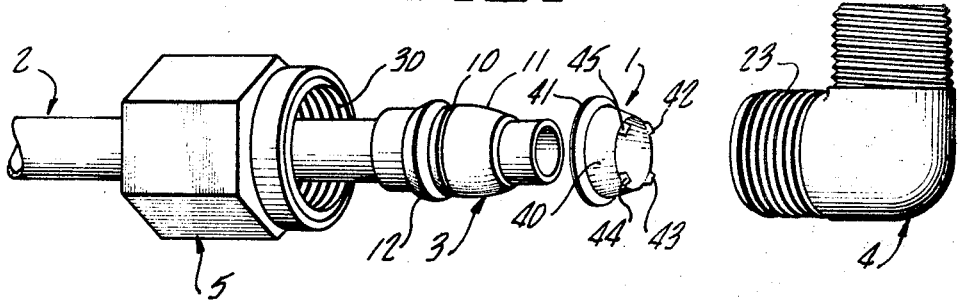

United States Patent Office 3,521,915
Patented July 28, 1970

3,521,915
FLARELESS CONNECTION AND SEALING ELEMENT FOR SUCH A CONNECTION
William James Scott, Costa Mesa, Calif., assignor to VSI Corporation, Pasadena, Calif., a corporation of Illinois
Filed Jan. 24, 1968, Ser. No. 700,225
Int. Cl. F16l 17/00
U.S. Cl. 285—341                                    11 Claims

ABSTRACT OF THE DISCLOSURE

An annular tapered sealing element is disposed between a convexly cuspate, truncated annular male mating surface of a first conduit and a conical, truncated female mating surface of a second conduit. The shape of the sealing element conforms to the contour of the female mating surface. A transverse flange extending around the larger end of the sealing element seats on a transverse annular surface at the base of the female mating surface. Four inwardly directed, elastically deflectable tabs are distributed around the smaller end of the sealing element to engage the first conduit.

---

This invention relates to connections between fluid conduits and, more particularly, to a more effective and reliable flareless connection and a sealing element for such a connection.

The so-called flareless connection is commonly employed to couple conduits in high-pressure fluid systems, particularly in the aerospace industry. Flareless connections may be used in various applications, one of which is the connection of one end of a flareless tube to a fitting such as an elbow, a cross, or a T-fitting.

One form of flareless tube-fitting connection comprises a sleeve which surrounds the tube at a point spaced back from one end of the tube. The end of the sleeve nearest the one end of the tube is crimped to the tube, thereby forming a convexly cuspate, truncated annular male mating surface spaced by a contact surface from the tube end. The connection may also include a fitting having a conical, truncated female mating surface dimensioned to fit with the male mating surface of the sleeve. Male threads are formed on the fitting's outer surface that surrounds the female mating surface. The connection further includes a nut with threads that mate with those of the fitting. The nut surrounds and bears against the shoulder of the sleeve as it engages the threads of the fitting so as to clamp the tube and the fitting together. As the male mating surface of the sleeve and the female mating surface of the fitting are thereby forced together, one or both surfaces are deformed to establish a seal between the fitting and the sleeve. The deformation of the components of such a connection necessary to establish the seal gives rise to several serious problems. First, the fitting or the sleeve is sometimes weakened to the extent that it fractures and causes a leak in the system. This problem is accentuated by the general practice in the aerospace industry of using as little material as possible in components to reduce weight. Second, the fitting sometimes becomes permanently deformed by the sleeve due to the excessive hoop stress that is created in forming the seal. Then the diameter of the threaded portion of the fitting is too large to permit the nut to be tightened. Third, it is difficult to reestablish a seal after the connection has been disassembled because the already deformed mating surfaces must be deformed differently to form the new seal.

A connection in accordance with the invention contemplates an annular tapered sealing element disposed between the mating surfaces of a flareless tube-to-fitting connection. The sealing element is made of ductile metal with a lower yield point than the mating surfaces. The shape of the sealing element conforms to the contour of the female mating surface. As the nut is tightened on the fitting, the sealing element yields before the mating surfaces to form a good seal therebetween. To take full advantage of this, the mating surfaces are clamped together only with sufficient force to exceed the yield point of the sealing element without exceeding the yield points of the mating surfaces. Thus, essentially all the deformation required to form a seal occurs in the sealing element and the other components are not permanently deformed or weakened to an appreciable extent.

Elastically deflectable positioning means such as a plurality of tabs extend inwardly from the smaller end of the sealing element. When the sealing element is placed against the male mating surface, the tabs engage the tube in an interference fit, thereby preventing removal or tilting of the sealing element in the course of the assembly of the connection.

A transverse flange extends from the larger end of the sealing element. The flange seats on a transverse seating surface of the fitting as the sealing element fits snugly against the female mating surface and the tabs engage the tube in the assembled connection. Thus, the flange controls the extent of penetration of the sealing element into the cavity in the fitting defined by the female mating surface. The diameter of the flange is less than the root diameter of the fitting threads to prevent interference with the threaded engagement between the fitting and the nut and further to prevent deformation of the sealing element.

The features of a specific embodiment of the invention are illustrated in the drawing, in which:

FIG. 1 is a perspective view prior to assembly of the components of an improved flareless connection incorporating the principles of the invention;

FIG. 2 is a front elevation view of the sealing element in FIG. 1;

FIG. 3 is a side elevation view of the sealing element in FIG. 1; and

FIG. 4 is a side elevation view partially in section of the flareless connection in FIG. 1 after assembly.

In the drawing, a sealing element 1 is shown that is designed to be used with components of a flareless tube-to-fitting connection to improve the effectiveness and the reliability of the connection. The components are a tube 2, a sleeve 3, a fitting 4, and a hex nut 5.

Sleeve 3 surrounds tube 2 and is set back from the end of tube 2 involved in the connection. The end of sleeve 3 nearest the end of tube 2 is crimped to the outer surface of tube 2 such that sleeve 3 becomes bowed as best illustrated in FIG. 4. An annular groove 10 may be provided to weaken sleeve 3 to facilitate this bowed effect upon crimping. As a result of the bowing of sleeve 3, a convexly cuspate, truncated male mating surface 11 is formed at the crimped end of sleeve 3. The crimping also tends to indent the tube itself radially inwardly at the crimp and to leave the tube somewhat enlarged in diameter in the direction of the tube end. After crimping, sleeve 3 is physically locked to tube 2 to comprise a first conduit and is sealed thereto at the crimp. Sleeve 3 also has an annular tapered bearing surface 12 through which a clamping force is applied by nut 5 to tube 2.

Fitting 4, which comprises a second conduit, has a cavity through it defined by a conical, truncated female mating surface 20 at the end of fitting 4 and a cylindrical surface 21 that extends to a transverse annular surface 22. Male threads 23 are formed on the outer surface of fitting 4 surrounding female mating surface 20 and surface 21. In standard fitting design, a conical female mating surface such as surface 20 encloses a solid angle of 24 degrees, i.e., it forms a 12-degree angle with the axis of the conical surface.

Nut 5 has female threads 30 that mate with threads 23 of fitting 4, a cavity 31 occupied by sleeve 3, and an annular tapered end surface 32 that bears against surface 12 as nut 5 is tightened. The nut 5 also has an external wrench receiving surface 33.

Sealing element 1 comprises in a thin unitary structure an annular tapered conical sealing portion 40, an annular transverse flange portion 41 extending transversely outward from the large end of portion 40, and elastically deflectable positioning means in the form of tabs 42, 43, 44, and 45 extending inwardly from the smaller end of portion 40 at substantially 90-degree intervals. The shape of portion 40 conforms closely to conical female mating surface 20 of fitting 4.

In the assembly of the components of the flareless connection the first step is to position sealing element 1 at the end of tube 2 as depicted in FIG. 1, to place sealing element 1 around tube 2, and to slide sealing element 1 up against sleeve 3 as depicted in FIG. 4. Tabs 42 through 45 extend inwardly at a greater angle to the axis of the conical surface of sealing element 1 than the angle formed by surface 20, namely at 45 degrees, and are sufficiently long to engage the outer surface of tube 2 when sealing element 1 surrounds tube 2. Depending on the circumstances, the tabs could extend inwardly at some other angle as long as they are designed with sufficient length to engage the outer surface of tube 2. Tabs 42 through 45 are deflected slightly outward when they engage the outer surface of tube 2 so that an interference fit is established between tube 2 and sealing element 1. The tabs locate sealing element 1 so its axis is aligned with the axis of surface 11. They also restrict tilting and free movement of sealing element 1 in the course of assembly of the connection so sealing element 1 tends to stay in the position on tube 2 in which it is placed. As noted generally above, the diameter of tube 2 between sleeve 3 and the end of tube 2 varies due to the crimping operation. The diameter is reduced where sleeve 3 is crimped to tube 2 and is correspondingly increased a distance from the crimp in the direction of the tube end. As sealing element 1 is placed around tube 2 and is slid against sleeve 3, tabs 42 through 45 follow the variations in diameter of tube 2 and remain in engagement therewith because they deflect elastically. The elasticity of the tabs permits them to conform to various tube diameters and to perform their aligning and retaining function regardless of the precise tube diameter where the tabs engage the tube.

Although the illustrated four tabs have given good results, a greater or lesser number could also be used. Other configurations of elastically deflectable positioning means might also be used. In the disclosed embodiment, the edges at the ends of tabs 42 through 45 that actually engage tube 2 are not designed to conform to the surface of tube 2. Therefore, these tabs each make essentially a point contact with tube 2. With such point contact tabs, at least three are required to perform the positioning function. Although more costly to produce, it might be desirable under some circumstances to design the edges at the ends of the tabs to conform to the outer surface of tube 2. In this case, a line contact would be formed between the edge of each tab and tube 2. Such a design would permit the use of as few as two tabs.

The second step of the assembly is to insert the end of tube 2 into the cavity in fitting 4 defined by surface 20 and surface 21. As tube 2 and sealing element 1 move into the cavity, flange portion 41 of sealing element 1 becomes seated on the end of fitting 4 as illustrated in FIG. 4. Thus, flange portion 41 serves to control the depth of penetration of sealing element 1 into the cavity in fitting 4 and to locate portion 40 snugly against mating surface 20. As illustrated in FIG. 4, the outer diameter of flange portion 41 is smaller than the root diameter of threads 23 to prevent interference with threads 30 of nut 5.

The final step in the assembly of the connection is to draw nut 5 up against the back sleeve 3 so end surface 32 bears against surface 12 and to tighten nut 5. Because mating surface 11 is convexly cuspate and surface 20 is conical, the area of the actual sealing surface therebetween is small, being theoretically a circle but in practice a thin annular band or ring of sealing area. Sealing element 1 is made of a ductile material with a lower yield point than the material from which mating surfaces 11 and 12 are formed. The term "yield point" is used in this specification in its technical strength-of-material sense to indicate the stress at which the stress-strain curve has a plateau and the elastic limit is reached. As tube 2 is forced into the cavity of fitting 4 by nut 5, portion 40 yields to form a seal between mating surfaces 11 and 20 before either surface 11 or 20 itself yields. Since portion 40 yields readily, a smaller hoop stress is exerted on the portion of fitting 4 between surfaces 20 and 21 and threads 23. Thus, an effective and reliable seal is established without fracturing or permanently deforming the other components of the connection. In the procedure, tube 2 may undergo slight axial movement (from left to right as viewed in FIG. 4) relative to sealing element 1, which is itself fixed in position by flange portion 41. The restraining action of the tabs is not sufficient to prevent this slight adjustment of tube 2 relative to sealing element 1 as nut 5 is tightened.

If the connection is later disassembled, the deformed sealing element is replaced with a new sealing element and an effective seal can be reestablished between mating surfaces 11 and 20 because they are not deformed. At the time of the disassembly of the connection, sealing element 1 is held on tube 2 by tabs 42 through 45 rather than remaining in the cavity of fitting 4, where it could be forgotten. In this regard, it should be noted that tabs 42 through 45 resist movement of tube 2 from right to left (as viewed in FIG. 4) relative to sealing element 1 more readily than from left to right due to the fact that tabs 42 through 45 angle inwardly from left to right.

By way of example, fitting 4 could be an aluminum forging having an average yield point at 55 kilopounds per square inch, sleeve 3 could be a case-hardened steel having an average yield and rupture point of 200 kilopounds per square inch, and sealing element 1 could be nickel annealed to have a maximum yield point of 30 kilopounds per square inch. To prevent galvanic corrosion between a steel sleeve and an aluminum fitting and to provide better sealing characteristics for element 1, it could be provided with a thin, tin plating, e.g., 0.0004 inch. It should be noted that the yield point of the plating is desirably below that of the element itself to help to maintain the integrity of the plating in the area of the actual seal.

Sealing element 1 could be formed by conventional stamping techniques from a thin flat sheet of metal. In forming tapered portion 40 in this way, the grain structure assumes a concentric ring configuration around the axis of the element that makes portion 40 tend to deform in annular fashion, that is, in a generally uniform manner around the circumference of the element along the ring or line of sealing, thereby forming a more effective seal. The thickness of sealing element 1 is important. If it is too thick, the material will creep to the extent that a leakage path will develop. If sealing element 1 is too thin, insufficient material is available to provide an effective seal. A sheet thickness of about 0.005 inch has been found to be satisfactory for flareless connections in which the outside diameter of tube 2 ranges from about 1/8 inch to about 2 inches.

What is claimed is:
1. A fluid tight flareless connection comprising:
a first conduit having a convexly cuspate, truncated annular male mating surface adjacent one end thereof;

a second conduit having a conical, truncated female mating surface dimensioned to fit with the mating surface of the first conduit;

an annular sealing element made of ductile metal having a lower yield point than material forming the mating surfaces, the sealing element comprising a conical sealing portion disposed between the mating surfaces of the first and second conduits, the sealing element having inwardly directed, elastically deflectable positioning means extending at the smaller end of said conical sealing portion to engage the first conduit between the male mating surface and the one end of the first conduit; and means for clamping the conduits together with sufficient force to exceed the yield point of the sealing element without exceeding the yield points of the material forming the mating surfaces to form a sealing engagement between the conical sealing portion and the said mating surfaces.

2. The flareless connection of claim 1, in which said positioning means includes at least three flat tabs provided at approximately equal intervals around the sealing element circumference, the tabs being deflected from their normal positions by said first conduit to form an interference fit therewith.

3. The flareless connection of claim 1, in which the second conduit has an external thread and a transverse annular surface at the base of the female mating surface and the sealing element has a transverse flange at its larger end that seats on the transverse surface of the second conduit, the diameter of the flange being less than the root diameter of the thread of the second conduit.

4. The flareless connection of claim 3, in which the shape of the sealing element conforms closely to the contour of the female mating surface and the flange of the sealing element is located such that it seats on the transverse surface of the second conduit as the sealing element fits snugly against the female mating surface.

5. The flareless connection of claim 1, in which the first conduit has a cylindrical outer surface and the male mating surface is formed by a sleeve surrounding the cylindrical outer surface, one end of the sleeve being crimped to the cylindrical outer surface the first conduit having a varied diameter at and adjacent the crimp by virtue of the crimping of the first conduit by the sleeve.

6. In a flareless connection between first and second conduits having a convexly cuspate, truncated annular male mating surface spaced by a contact surface from one end of the first conduit, a conical truncated female mating surface formed at one end of the second conduit, the female mating surface fitting together with the male mating surface of the first conduit, male threads formed in the outer surface of the second conduit surrounding the female mating surface, an annular transverse surface at the base of the female mating surface of the second conduit, and a nut surrounding the first conduit and having female threads engaging the male threads of the second conduit, the nut bearing on the first conduit to force the first and second conduits together as the nut is tightened, the improvement comprising:

a seal made of ductile metal with a lower yield strength than that of the mating surfaces, the seal having an annular tapered portion disposed between the mating surfaces and conforming to the contour of the female mating surface, a transverse flange portion around the larger end of the tapered portion, the flange portion seating on the transverse surface of the second conduit such that the tapered portion of the seal fits snugly against the female mating surface, and inwardly directed, elastically deflectable positioning means at the smaller end of the tapered portion to engage the contact surface of the first conduit between the male mating surface and the one end of the first conduit, the positioning means being deflected from their normal positions by the first conduit to establish an interference fit therewith.

7. The seal of claim 6, in which the positioning means comprises at least three flat tabs spaced around the seal at approximately equal intervals.

8. The seal of claim 6 having a grain structure that is substantially concentric about the seal axis.

9. The seal of claim 6 having a thin plating of metallic material with a lower yield point than the remainder of the seal.

10. A seal for a flareless connection made from a thin mass of ductile metal having a low yield point, the seal comprising:

an annular tapered portion disposed about an axis;

an annular flange portion extending outwardly from the larger end of the tapered portion transverse to the axis; and at least three elastically deflectable tabs extending inwardly from the smaller end of the tapered portion.

11. The seal of claim 10, in which the tabs form a larger angle with the axis than the tapered portion.

References Cited

UNITED STATES PATENTS

| | | | |
|---|---|---|---|
| 1,426,724 | 8/1922 | Fyffe | 285—341 X |
| 2,100,796 | 11/1937 | Church | 285—341 X |
| 3,219,367 | 11/1965 | Franck | 285—341 X |
| 3,245,704 | 4/1966 | Franck | 285—341 |
| 3,290,069 | 12/1968 | Davis | 285—341 |
| 3,418,010 | 12/1968 | Buckner | 285—341 X |

FOREIGN PATENTS 1,396,686  3/1965  France.

DAVID J. WILLIAMOWSKY, Primary Examiner

W. L. SHEDD, Assistant Examiner

U.S. Cl. X.R.

285—347